(12) United States Patent
Farmer et al.

(10) Patent No.: US 8,634,852 B2
(45) Date of Patent: Jan. 21, 2014

(54) CAMERA ENABLED HEADSET FOR NAVIGATION

(75) Inventors: Dominic Gerard Farmer, Los Gatos, CA (US); Linda G. Gunderson, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 78 days.

(21) Appl. No.: 13/240,936

(22) Filed: Sep. 22, 2011

(65) Prior Publication Data

US 2012/0252483 A1 Oct. 4, 2012

Related U.S. Application Data

(60) Provisional application No. 61/429,560, filed on Jan. 4, 2011.

(51) Int. Cl.
*H04W 24/00* (2009.01)
*H04W 64/00* (2009.01)
*H04W 4/02* (2009.01)

(52) U.S. Cl.
CPC ............. *H04W 64/00* (2013.01); *H04W 4/02* (2013.01)
USPC ....... 455/456.1; 382/255; 382/294; 705/26.8; 715/719

(58) Field of Classification Search
USPC ......... 455/456.1; 382/255, 294; 705/14, 26.8; 707/6; 715/719
See application file for complete search history.

(56) References Cited

U.S. PATENT DOCUMENTS

| 6,266,442 | B1 | 7/2001 | Laumeyer et al. |
| 6,510,325 | B1 | 1/2003 | Mack, II et al. |
| 6,845,338 | B1 | 1/2005 | Willins et al. |
| 7,487,112 | B2* | 2/2009 | Barnes, Jr. .................... 705/26.8 |
| 7,720,436 | B2 | 5/2010 | Hamynen et al. |
| 2002/0109579 | A1 | 8/2002 | Pollard et al. |
| 2005/0278446 | A1 | 12/2005 | Bryant |
| 2007/0118426 | A1* | 5/2007 | Barnes, Jr. ...................... 705/14 |
| 2007/0173266 | A1* | 7/2007 | Barnes, Jr. .................. 455/456.1 |
| 2007/0229396 | A1 | 10/2007 | Rajasingham |
| 2008/0082363 | A1 | 4/2008 | Habashi |
| 2009/0129693 | A1* | 5/2009 | Bloebaum et al. ............. 382/255 |
| 2009/0144624 | A1* | 6/2009 | Barnes, Jr. ..................... 715/719 |
| 2009/0193021 | A1* | 7/2009 | Gupta et al. ....................... 707/6 |
| 2009/0247245 | A1 | 10/2009 | Strawn et al. |
| 2009/0297063 | A1* | 12/2009 | Camp et al. ................... 382/294 |
| 2010/0070162 | A1 | 3/2010 | Aihara |
| 2010/0226535 | A1 | 9/2010 | Kimchi et al. |
| 2010/0245585 | A1 | 9/2010 | Fisher et al. |

OTHER PUBLICATIONS

International Search Report and Written Opinion—PCT/US2012/020223—ISA/EPO—Apr. 10, 2012.

(Continued)

*Primary Examiner* — William D Cumming
(74) *Attorney, Agent, or Firm* — Arnold J. Gum

(57) ABSTRACT

A method for providing location determination includes generating digital images using an imaging device in a headset configured to provide hands-free communication with a mobile device where the digital images are indicative of at least a scene in a direction of a user's gaze. The digital images are filtered and transmitted to the mobile device. The mobile device processes the filtered digital images to generate location information associated with the user's gaze. The headset may be a wired or wireless headset.

27 Claims, 4 Drawing Sheets

(56) References Cited

OTHER PUBLICATIONS

Tenmoku R et al: A wearable augmented reality system for navigationsing positioning infrastructures and a pedometer, Mixed and Augmented Reality, 2003. Proceedings. The Second IEEE and ACM International Symposium on Oct. 7-10, 2003, Piscataway, NJ, USA, IEEE, Oct. 7, 2003, pp. 344-345, XP010662860, DO/: 10.1109/ ISMAR. 2003.1240752, ISBN: 978-0-7695-2006-3 paragraphs (0002), (0003).

Tenmoku R et al: "A wearable augmented reality system using positioning infrastructures and a pedometer", Wearable Computers, 2003. Proceedings. Seventh IEEE International Symposium on Oct. 21-23, 2003, Piscataway, NJ, USA,IEEE, Los Alamitos, CA, USA, (Oct. 21, 2003), pp. 110-1 17, XP010664911, DOI: 10.1109/ ISWC. 2003.1241400, ISBN: 978-0-7695-2034-6 p. 111-p. 112; figures 1,2.

\* cited by examiner

CAMERA ENABLED HEADSET FOR NAVIGATION

CROSS-REFERENCE TO RELATED APPLICATION

This application claims the benefit of U.S. Provisional Patent Application Ser. No. 61/429,560, filed on Jan. 4, 2011, of Dominic G. Farmer, which application is incorporated herein by reference in its entirety.

BACKGROUND

1. Field

This disclosure generally relates to navigation.

2. Background

Positioning determination using satellite navigation systems (SPS) such as the Global Positioning System (GPS) has been widely applied in mobile devices or mobile handsets, such as mobile telephones or smartphones. SPS receivers normally determine their position by computing times of arrival of signals transmitted from a multiplicity of satellites. These satellites transmit, as part of their navigation message, both satellite position data as well as timing data on clock timing, so-called "almanac" and "ephemeris" data. The process of searching for and acquiring satellite signals, reading the data for a multiplicity of satellites and computing the location of the receiver from this data is time consuming, often requiring several minutes. In many cases, this lengthy processing time is unacceptable and, furthermore, greatly limits battery life in miniaturized portable applications.

Conventional SPS receiving equipment works best in open spaces since the satellite signals are weak and their detection and time-of-arrival determination can be degraded by attenuation and/or reflection in other environments (e.g., indoors, or outdoors in the presence of buildings or other objects). Improved SPS receivers provide signal sensitivity that allows tracking satellite signals indoors, or in the presence of weak multipath signals or signals that are pure reflections. The ability to acquire such weak satellite signals, however, remains difficult and typically causes other problems.

Wireless headsets, for example Bluetooth earpieces, and wired headsets have come into greater use as a result of many states adopting hands-free laws. Wireless headsets communicate with a mobile device, typically using Bluetooth communication protocol. Bluetooth earpieces are primarily used to provide audio function.

One area of focus involves hands-free wireless communication where wireless headsets communicate with a local mobile device via a local wireless network.

Because wireless headsets free up a user's hands while the user communicates with friends, family, and colleagues using their mobile device, users are free to perform other tasks, such as driving, shopping, etc. As a result, wireless headsets increase the convenience of using a mobile device.

SUMMARY

Systems, apparatuses, and methods disclosed herein provide for an enhanced headset for enhanced navigation functions. In one embodiment, a method for providing location determination includes generating digital images using an imaging device in a headset configured to provide hands-free communication with a mobile device where the digital images are indicative of at least a scene in a direction of a user's gaze, filtering the digital images, transmitting the filtered digital images to the mobile device, and processing the filtered digital images to generate location information associated with the user's gaze.

According to another aspect of the present invention, a system for providing location determination includes a headset configured to provide hands-free communication with a mobile device where the headset includes an imaging device and a processor. The imaging device is configured to generate digital images indicative of at least a scene in a direction of a user's gaze and the processor is configured to filter the digital images. The mobile device includes a processor and a memory where the mobile device is in communication with the headset to receive the filtered digital images and to process the filtered digital images to generate location information associated with the user's gaze.

DETAILED DESCRIPTION

Figure 1:
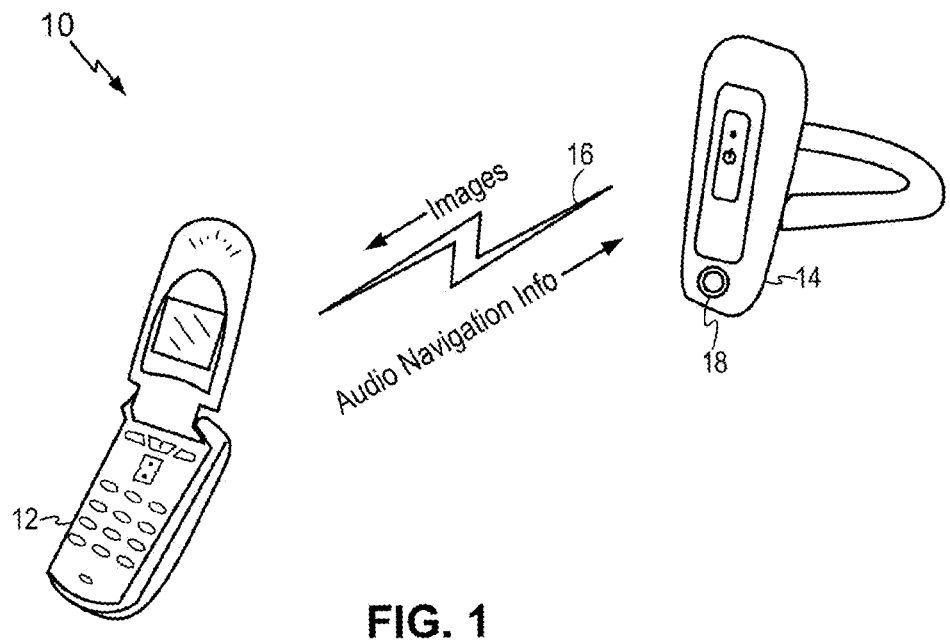
FIG. 1 illustrates a camera-based navigation system using a wireless headset according to one embodiment of the present invention.

The nature, objectives, and advantages of the disclosed method and apparatus will become more apparent to those skilled in the art after considering the following detailed description in connection with the accompanying drawings.

According to embodiments of the present invention, a camera-based navigation system includes a headset equipped with a digital imaging device that (in operation) communicates with a mobile device. The camera-based navigation system can implement position determination using digital images captured by the imaging device on the headset and provided to the mobile device. Signal processing functions implemented in the mobile device and/or the headset allow the navigation system to derive accurate attitude, relative direction, relative velocity and delta position estimates from the digital images.

Camera-based navigation has the advantage of providing high accuracy location determination in challenged environments, such as in urban settings and indoor environments. In other embodiments, navigation information based on the position information derived from the digital images can be generated and supplied to the user through the audio function of the headset and/or through the visual display on the mobile device.

According to other embodiments of the present invention, the camera-based navigation system is assisted by an absolute positioning system, such as satellite-based positioning, terrestrial positioning, hybrid positioning, etc. Accordingly, in some embodiments, the positioning information derived from the camera-based navigation system is combined with the absolute positioning capability of an SPS receiver to provide a complete location determination and navigation solution for most challenged navigation environments, including pedestrian location determination, indoor, and urban use.

Integration of a digital imaging device, such as one or more micro-cameras, into the headset for a mobile device enables the user to utilize camera-based navigation without having to carry or clip on additional equipment. With the widespread use of wireless headsets with mobile telephones, integrating an imaging device into the wireless headset enables camera-based navigation to be incorporated seamlessly into existing mobile devices. A navigation system that requires an independent camera to be separately attached to the body could be unattractive and inconvenient to most users. In the camera-based navigation system of the present invention, the integration of the imaging device is transparent to the user. By co-locating the imaging device in headset for a mobile device, the imaging device can be integrated in an unobtrusive manner, increasing the ease of use and convenience for the user.

As used herein, a mobile device refers to a device such as a cellular or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. The term "mobile device" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile device" is intended to include all devices, including wireless communication devices, computers, laptops, etc. which are capable of communication with a server, such as via the Internet, WiFi, or other network, and regardless of whether satellite signal reception, assistance data reception, and/or position-related processing occurs at the device, at a server, or at another device associated with the network. Any operable combination of the above are also considered a "mobile device."

As used herein, a headset refers to a hands-free communication device that enables a user to communicate with a mobile device using a wired or wireless interface. A conventional headset enables audio communication with the mobile device. In the case of a wireless headset, the wireless headset communicates with the mobile device using a local wireless interface. In exemplary embodiments, the local wireless interface comprises a short-range ad hoc wireless network, such as a Bluetooth network. A Bluetooth network is a universal radio interface that enables two or more wireless devices to communicate wirelessly via short-range ad hoc networks. Details regarding Bluetooth technology are available at the Bluetooth official website at www.bluetooth.com.

In the exemplary embodiments described below, a short-range ad hoc wireless network or a Bluetooth network is used to implement the local wireless interface between the wireless headset and the mobile device. In other embodiments, the local wireless interface can be implemented using any wireless interface. The use of a Bluetooth network is illustrative only and is not intended to be limiting. A headset includes a support to secure the components of the headset to the head of a user. The support may be an ear support or a head support.

In one embodiment, the camera-based navigation system of the present invention is implemented using a wireless headset, as shown in FIG. 1. Referring to FIG. 1, a camera-based navigation system 10 includes a wireless headset 14 equipped with one or more built-in micro-cameras 18. In the example of FIG. 1, micro-camera 18 is positioned at a location on the wireless headset so that when the wireless headset is being worn by a user, the micro-camera will be pointed in the direction of the user's gaze. The camera-based navigation system 10 further includes a mobile device 12 which is illustrated as a mobile telephone in the present embodiment. The mobile device 12 communicates with the wireless headset 14 through a wireless communication link 16, such as through a Bluetooth short-range wireless network. The mobile device 12 also communicates with a base device through a wireless network. In operation, images captured by the micro-camera 18 on the wireless headset 14 are processed and transmitted downlink from the wireless headset 14 to the mobile device 12. The mobile device 12 processes the received images to provide a position determination. In some embodiments, the mobile device 12 provides audio navigation information to the wireless headset 14 through an uplink transmission.

Figure 2:
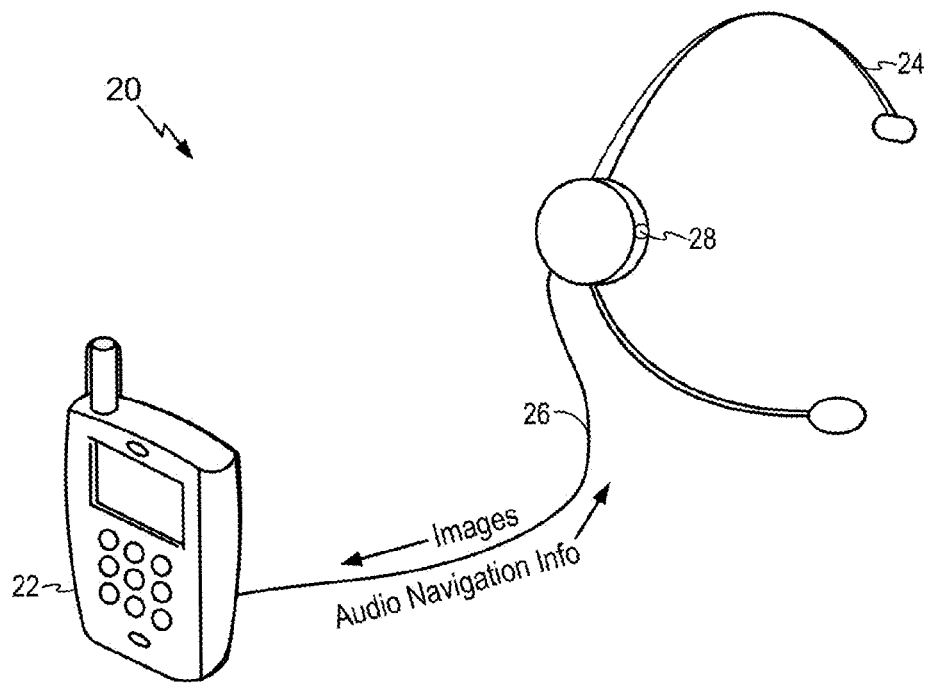
FIG. 2 illustrates a camera-based navigation system using a wired headset according to one embodiment of the present invention.

In another embodiment, the camera-based navigation system of the present invention is implemented using a wired headset, as shown in FIG. 2. Referring to FIG. 2, a camera-based navigation system 20 includes a wired headset 24 equipped with a built-in micro-camera 28. The micro-camera 28 is positioned at a location on the wired headset so that when the wired headset is being worn by a user, the micro-camera will be pointed in the direction of the user's gaze. The camera-based navigation system 20 further includes a mobile device 22 which is illustrated as a smart phone in the present embodiment. The mobile device 22 communicates with the wired headset 24 through a cable 26. The mobile device 22 also communicates with a base device through a wireless network. In operation, images captured by the micro-camera 28 on the wired headset 24 are processed and transmitted downlink from the wired headset 24 to the mobile device 22. The mobile device 22 processes the received images to provide a position or location determination. In particular, in embodiments of the present invention, the mobile device 12, 22 utilizes computer vision or machine vision to extract information from the received images to obtain position or location information. Computer vision or machine vision technology is known for use in extracting information from images. In some embodiments, the mobile device 2 provides audio navigation information to the wired headset 24 through an uplink transmission.

In some embodiments, the mobile device 12, 22 utilizes information from a database, such as a stored floor plan, to derive the position determination. Alternately, the mobile device may derive location information from images of an address, office nameplate, or office room number, received from the headset 14, 24. Furthermore, in some embodiments, the user's direction and/or orientation can be tracked through the images obtained from the integrated micro-camera. In some embodiments, the mobile device incorporates software and hardware to process the captured digital images to identify the locations the user is looking at.

In other embodiments, the headset (wired or wireless) may further include a ranging device to determine the distance from the headset to a specific target. In one embodiment, the ranging device is an infra-red based or laser based distance determination device. In some embodiments, multiple devices may be incorporated into the headset to facilitate ranging. For example, multiple cameras may be incorporated into the headset to facilitate stereo triangulation (e.g., multiple forward-facing and/or multiple side-facing cameras).

In other embodiments, the wireless headset 14 or the wired headset 24 may further include a SPS receiver and/or a SPS antenna to enable satellite positioning. The position determination information obtained from the SPS system (or other absolute positioning system) may be used in conjunction with the position determination information obtained from the digital images to provide the user with location and navigation information. In other embodiments, the SPS receiver and/or SPS antenna may be incorporated in the mobile device. The mobile device operates on both the captured images and the location information from the SPS receiver to provide the location determination and any navigation information.

Figure 3:
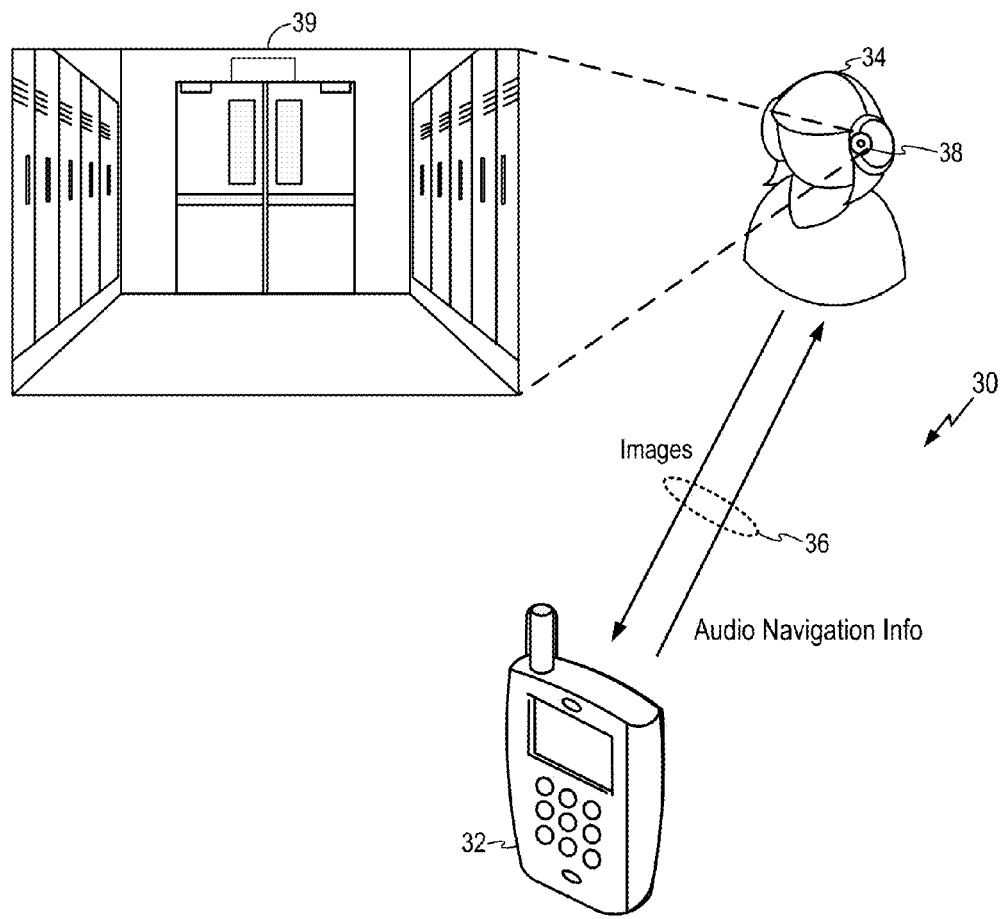
FIG. 3 illustrates an operating environment in which the camera-based navigation system is applied according to one embodiment of the present invention.

One important application of the camera-based navigation system of the present disclosure is in an indoor setting where absolute positioning systems, such as SPS, may not provide sufficient positioning accuracy. FIG. 3 illustrates an operating environment in which the camera-based navigation system is applied according to one embodiment of the present invention. Referring to FIG. 3, a user of a camera-based navigation system 30 wears a wireless headset 34, equipped with a micro-camera 38. The user also carries a mobile device 32 which is in communication with the wireless headset 34. The micro-camera 38 captures the image of the scene in the direction of the user's gaze. The scene in the direction of the user's gaze can be referred to as a scene in a "forward" direction for a headset mounted camera pointing generally forward when in use, while "transverse" refers to the direction approximately perpendicular to the user's gaze in such a configuration.

For example, an image 39 of an indoor hallway and a door is captured. The captured image or images are processed by the wireless headset 34 and then transmitted to the mobile device 32 through a wireless link 36. The mobile device 32 uses the captured images in conjunction with stored information, such as the floor plan of the building, to derive the location and/or the head orientation of the user. The mobile device 32 may provide audio navigation information to the user through the communication link 36. In other embodiments, the mobile device 32 may provide visual navigation information on the mobile device's display. Visual navigation information can include active or passive information that can be used by the circuitry of the mobile device to display navigation images such as maps, static or moving arrows indicating a direction, pathway indications, etc.

Figure 4:
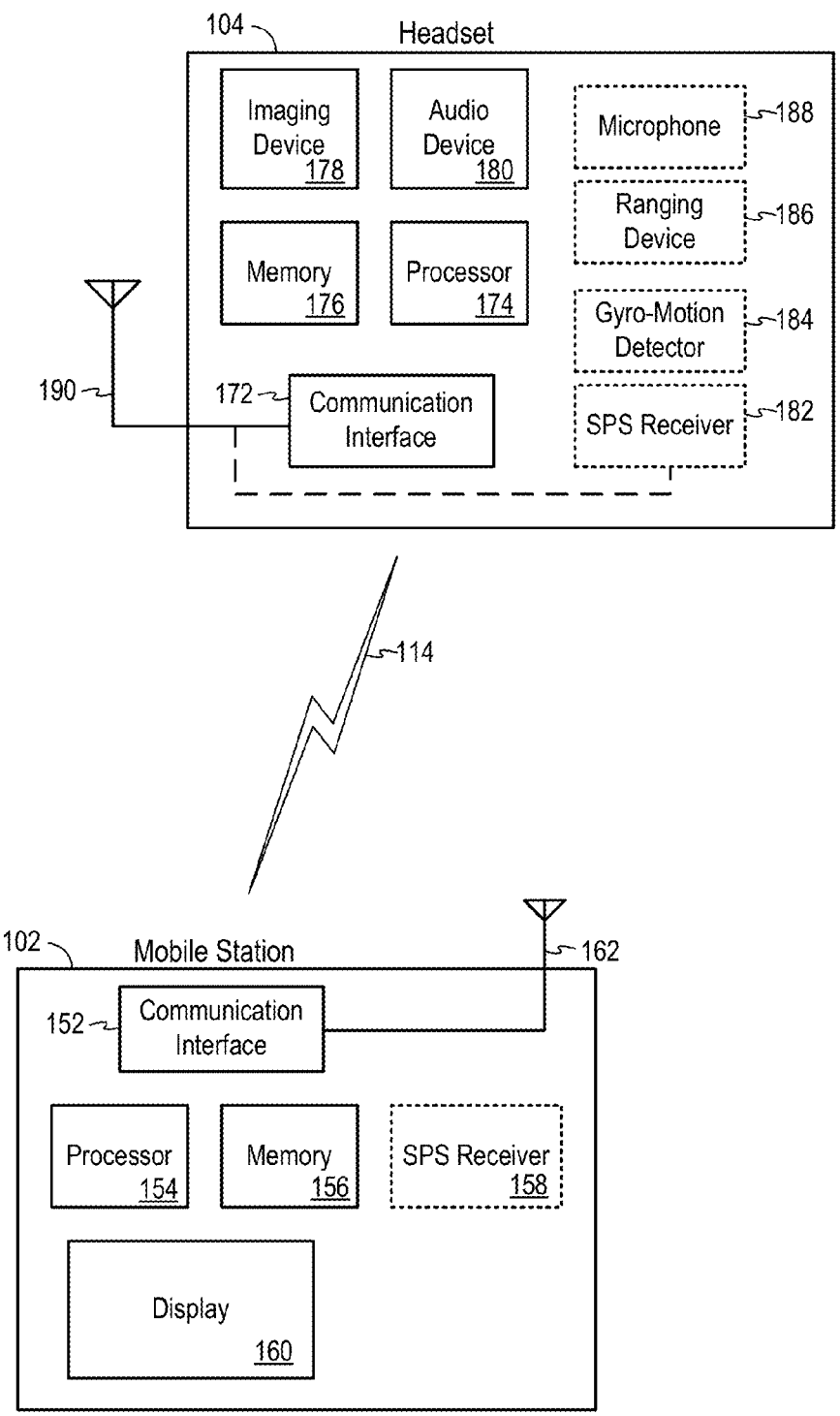
FIG. 4 is a schematic diagram illustrating a wireless headset and a mobile device which can be used to construct the camera-based navigation system according to one embodiment of the present invention.

A headset and a mobile device for use in the camera-based navigation system of the present invention are constructed as follows and as shown in FIG. 4. In one embodiment, a headset 104 includes a communication interface 172. When headset 104 is a wireless headset, the communication interface 172 is a wireless transceiver for transmitting and receiving signals from the communication link 114 via an antenna 190. When headset 104 is a wired headset, the communication interface 172 is a suitable communication interface and antenna 190 may be omitted.

The headset 104 further includes a processor 174 for executing instructions to control the operations of the headset, a memory 176 for storing operating instructions, data and captured images and an imaging device 178 to capture images of the operating environment. The processor 174 of the headset 104 may execute instructions stored in memory 176 to perform filtering operations to filter the captured images to a level suitable for transmission to the associated mobile device. For instance, the filtering operations may filter the images to a level suitable for the wireless bandwidth for wireless transmission to the mobile device. The headset 104 further includes audio device 180, such as a speaker, to generate audio signals for the user.

The headset 104 may further include the following optional elements. The headset 104 may include a microphone 188 for receiving audio signals from a user, a ranging device 186 for determining the distance from the headset to a target and one or more motion sensors such as gyro-motion detector 184 for detecting head and body motion and providing directional information. Finally, the headset 104 may include a SPS receiver 182. The SPS receiver 182 may be coupled to the antenna 190 to receive satellite signals. The elements of headset 104 is typically formed in an enclosure and attached to a support (not shown) for securing the headset to the head of a user, such as through an ear support.

In one embodiment, a mobile device 102 includes a communication interface 152. When headset 104 is a wireless headset, the communication interface 152 is a wireless transceiver for transmitting and receiving signals from the communication link 114 and transmitting and receiving signals from a base device via an antenna 162. When headset 104 is a wired headset, the communication interface 152 is a suitable communication interface to facilitate the wired communication.

The mobile device 102 further includes a processor 154 for controlling the operation of the mobile device, a memory 156, and a display 160. The memory 156 may be used to store operating instructions and may also store some or all of the digital image information received from the headset 104. In some embodiments, the mobile device 102 includes an SPS receiver 158 is provided in the mobile device 102.

As noted above, the current techniques may be used in an environment in which satellite positioning is challenging; e.g., where a satellite positioning solution may be determined but where the accuracy of the satellite positioning solution may be inadequate for some reason. In one example, the uncertainty of the satellite positioning solution may be degraded due to a complex multipath environment (such as an urban canyon environment). In such an environment, precise navigation information may be even more desirable than in a more suburban environment, due to the density of businesses and people.

In such a situation, image processing may be used in conjunction with satellite positioning information to improve positioning/navigation. A satellite position may have an associated uncertainty that exceeds the amount desired for efficient navigation in the particular environment (e.g., an indoor environment, urban environment and/or a pedestrian environment). A user may obtain one or more images using the mounted camera. The image information may be processed to determine a more precise location; that is, a location with a second uncertainty less than the first uncertainty. If the user continues to move, a number of techniques can be used to update the location. In one technique, additional images may be obtained as the user moves, and the additional image information processed to update the location.

In one technique, the position may be updated using sensors (e.g., accelerometers and/or gyroscopes) until the position uncertainty exceeds an amount desired for efficient navigation in the particular environment. Once the position uncertainty exceeds this amount, additional image(s) may be obtained and processed to update the location.

Image processing for navigation may comprise comparing image data to stored data to determine whether all or part of the image from the camera corresponds to stored image information. If so, the user's location may be determined to be the location associated with the stored image. This processing may require significant computational resources. In one technique, the required resources may be reduced by using the current position and position uncertainty to limit the amount of stored image data used in the comparison. In some cases, image data from the camera may be transmitted to one or more network resources, and processing performed at a server or other network resource with more processing capability than that available locally.

One technique that may be beneficial in a pedestrian implementation (indoor and/or outdoor) recognizes that image information may be more useful if one or more recognizable symbols can be obtained from the image. In an example embodiment, a user may turn the camera toward a feature that includes one or more symbolic elements such as letters, numbers, icons, and/or other symbols and obtain an image. The image may be processed to determine the one or more symbolic elements, and then rather than comparing acquired image data to stored data, the processing may comprise searching for a match of the symbolic elements.

For example, a user may, either in response to a prompt or without prompting, turn to a storefront, street sign, or the like so that letters, words, and/or numbers (and/or other symbols) are in view of the camera. The camera may capture an image including the symbols (in response to user input, or automatically). The image information can be processed using a technique such as optical character recognition to determine the symbols in the image. The determined letters, words, icons and/or numbers may be used to associate the image with a particular location. This can be particularly useful when the user does not understand at least some of the symbols (e.g., when travelling in a foreign country).

In another embodiment, one or more cameras may be provided to acquire image data in a direction different than the direction of travel of the user (instead of or in addition to one or more cameras positioned to acquire image data in the direction of user travel). In a pedestrian environment, such a camera may capture image data on storefronts, signs, or other features that the user passes as he walks by.

In one embodiment, image data may be acquired at one rate using a camera positioned to acquire image data along the direction of travel, and a different rate using a camera positioned to acquired image data along a different direction (e.g., to the side/transverse to the direction of travel). In a pedestrian implementation, the objects in the field of view will generally be slowly changing; the distance between the user and a particular object will slowly decrease, and then the object will pass out of the user's view. Objects in a direction perpendicular to the direction of travel will be changing more quickly as the user passes by. Therefore, a higher image acquisition rate may be used for image acquisition in the direction transverse to the direction of travel.

In another embodiment, image processing may include multiple steps. For example, a user may be travelling in a particular direction at an initial time, and first image data may be acquired. The first image data may be processed to identify one or more features in the field of view that is more likely to be associated with location information in the database. For example, the view in front of a user walking in along a city sidewalk may include many objects, some of which are always at that location (e.g., buildings, signs, and lights) and some of which are temporary (e.g., people and cars). The first image data may be processed to identify particular fixed features as more likely to be associated with location information in the database, such as signs and building features. These features may be identified by shape, color, size, position, and/or other parameters. The identified feature or features may be used to obtain an associated location by comparing the associated image data with data in the database.

According to embodiments of the present invention, database information, such as a building floor plan, a campus map, or office location listing may be stored in the memory 156 of the mobile device 102. The database information may be the used in conjunction with the captured images to provide location and navigation information. Location and navigation information may be provided to the user as audio signals through the communication link 114 or as visual signals for display on the display 160.

The current techniques can also be beneficial in an indoor positioning application. Satellite positioning may not be available indoors, due to the attenuation of weak satellite signals. Positioning techniques using signals received from/transmitted to terrestrial infrastructure may be used to determine the position of the user, but may not be accurate enough for efficient navigation. As with the examples above, image information may be captured, processed, and compared to database information to determine associated location information. For example, an image of a feature of an indoor space may be captured and compared to stored feature information for the approximate location of the user. If a match is determined, the location information associated with the stored feature information is determined to be the location of the user.

In the present description, a wireless headset and a mobile device both contain a pairing circuit. Pairing allows the wireless headset and the mobile device, after the wireless headset and the mobile device are successfully paired, to establish a wireless connection between them. These pairing circuits are operable to pair the wireless headset and the mobile device when pairing information associated with the individual headset and mobile device compare favorably. If the pairing information associated with the individual headset and mobile device compares unfavorably, these individual components may not pair to form a modular wireless communication system.

Figure 5:
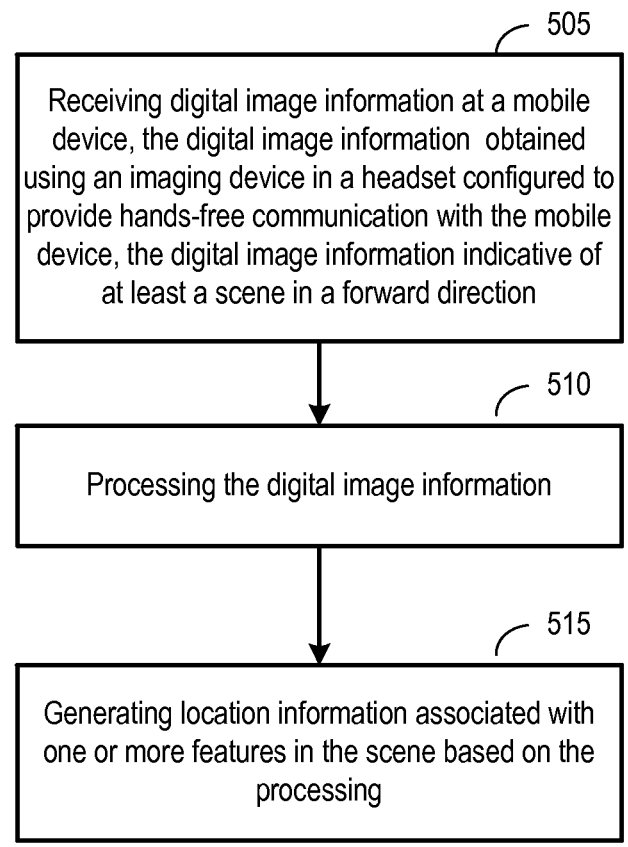
FIG. 5 is a flow diagram of a method for providing location determination.

FIG. 5 is a flow diagram of a method 500 for providing location determination according to an embodiment. At stage 505, the method 500 includes receiving digital image information at a mobile device, the digital image information obtained using an imaging device in a headset configured to provide hands-free communication with the mobile device, the digital image information indicative of at least a scene in a forward direction. At stage 510, the method 500 includes processing the digital image information. At stage 515, the method 500 includes generating location information associated with one or more features in the scene based on the processing.

In the present description, the mobile device may communication with one or more wireless communication networks, such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), Time Division Synchronous Code Division Multiple Access (TD-SCDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, for example. Wireless communication networks may include so-called next generation technologies (e.g., "4G"), such as, for example, Long Term Evolution (LTE), Advanced LTE, WiMAX, Ultra Mobile Broadband (UMB), and/or the like. In addition to or as an alternative to such example WWAN, WLAN technologies and the like, in certain example implementations, assistance information (e.g., TOW-Assist, etc.) may be transmitted to device 202 via a broadcast technology such as MediaFLO, ISDB-T, DVB-H, and/or the like.

The method and apparatus described herein may be used with various satellite positioning systems (SPS), such as the United States Global Positioning System (GPS), the Russian Glonass system, the European Galileo system, any system that uses satellites from a combination of satellite systems, or any satellite system developed in the future. Furthermore, the disclosed method and apparatus may be used with positioning determination systems that utilize pseudolites or a combination of satellites and pseudolites. Pseudolites are ground-based transmitters that broadcast a PN code or other ranging code (similar to a GPS or CDMA cellular signal) modulated on an L-band (or other frequency) carrier signal, which may be synchronized with GPS time. Each such transmitter may be assigned a unique PN code so as to permit identification by a remote receiver. Pseudolites are useful in situations where signals from an orbiting satellite might be unavailable, such as in tunnels, mines, buildings, urban canyons or other enclosed areas. Another implementation of pseudolites is known as radio-beacons. The term "satellite", as used herein, is intended to include pseudolites, equivalents of pseudolites, and others. The term "SPS signals", as used herein, is intended to include SPS-like signals from pseudolites or equivalents of pseudolites.

Those skilled in the art will understand that information and signals may be represented using any of a variety of different technologies and techniques. For example: data, information, signals, bits, symbols, chips, instructions, and commands may be referenced throughout the above description. These may be represented by voltages, currents, electromagnetic waves, magnetic fields or particles, optical fields or particles, or any combination thereof.

In one or more exemplary embodiments, the functions and processes described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. Propagating signals are not "computer readable storage media." By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. The term "control logic" used herein applies to software (in which functionality is implemented by instructions stored on a machine-readable medium to be executed using a processor), hardware (in which functionality is implemented using circuitry (such as logic gates), where the circuitry is configured to provide particular output for particular input, and firmware (in which functionality is implemented using re-programmable circuitry), and also applies to combinations of one or more of software, hardware, and firmware.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a memory, for example the memory of mobile device, and executed by a processor, for example the microprocessor of mobile device. Memory may be implemented within the processor or external to the processor. As used herein the term "memory" refers to any type of long term, short term, volatile, nonvolatile, or other memory and is not to be limited to any particular type of memory or number of memories, or type of media upon which memory is stored.

Also, computer instructions/code may be transmitted via signals over physical transmission media from a transmitter to a receiver. For example, if the software is transmitted from a website, server, or other remote source using a coaxial cable, fiber optic cable, twisted pair, digital subscriber line (DSL), or physical components of wireless technologies such as infrared, radio, and microwave. Combinations of the above should also be included within the scope of physical transmission media.

Moreover, the previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the features shown herein but is to be accorded the widest scope consistent with the principles and novel features disclosed herein.

What is claimed is:

1. A method for providing location determination, comprising:
    receiving digital image information at a mobile device, the digital image information obtained using an imaging device in a headset configured to provide hands-free communication with the mobile device, the digital image information indicative of at least a scene in a forward direction;
    receiving signal information from one or more motion sensors associated with the wireless headset, the signal information indicating motion of a user of the mobile device;
    processing the digital image information; and
    generating location information associated with one or more features in the scene based on the processing;
    generating a position of the mobile device using the location information associated with one or more features in the scene based on the processing of the digital image information; and
    updating the position of the mobile device using the signal information from the one or more motion sensors.

2. The method of claim 1, further comprising:
    generating audio navigation information based on the location information; and transmitting the audio navigation information to the headset.

3. The method of claim 1, further comprising:
generating visual navigation information based on the location information, and displaying navigation images based on the visual navigation information on a display of the mobile device.

4. The method of claim 1, wherein receiving the digital image information comprises receiving filtered digital images at the mobile device through a wireless communication link.

5. The method of claim 1, further comprising receiving additional digital image information at the mobile device, the additional digital image information indicative of a different scene in a direction different than the forward direction;
processing the additional digital image information indicative of the different scene;
generating updated location information associated with one or more features in the different scene based on the processing of the additional digital image information; and
generating an updated position of the mobile device using the updated location information associated with one or more features in the scene.

6. The method of claim 5, wherein filtering the digital images comprises filtering the digital images to a level suitable for a wireless bandwidth for wireless transmission to the mobile device.

7. The method of claim 1, further comprising:
accessing satellite positioning information indicative of the position of the mobile device with a first uncertainty; and
refining the satellite positioning information indicative of the position of the mobile device using the location information associated one or more features in the scene to generate a location of the mobile device with a second uncertainty less than the first uncertainty.

8. The method of claim 1, wherein processing the digital image information comprises comparing at least a portion of the digital image information with stored information, and wherein generating location information associated with one or more features in the scene based on the processing comprises accessing an associated location based on the comparing.

9. The method of claim 1, wherein processing the digital image information comprises recognizing one or more symbols in the scene.

10. A mobile device, comprising:
circuitry to receive digital image information from a wireless headset configured to provide hands-free communication with the mobile device, the digital image information indicative of at least a scene in a forward direction;
circuitry to receive signal information from one or more motion sensors associated with the wireless headset, the signal information indicating motion of a user of the mobile device; and
a processor to process the digital image information and to generate location information associated with one or more features in the scene based on the processing, wherein the processor is further configured to generate a position of the mobile device using the location information associated with one or more features in the scene based on the processing, and to update the position of the mobile device using the signal information from the one or more motion sensors.

11. The mobile device of claim 10, wherein the processor is further configured to generate audio navigation information based on the location information; and
circuitry to transmit the audio navigation information to the headset.

12. The mobile device of claim 10, wherein the processor is further configured to generate visual navigation information based on the location information, and wherein the mobile device further comprises a display to display navigation images using the visual navigation information.

13. The mobile device of claim 10, wherein the digital image information comprises receiving filtered digital image information.

14. The mobile device of claim 10, wherein processor is configured to process the digital image information by comparing at least a portion of the digital image information with stored information, and to generate the location information associated with one or more features in the scene by accessing an associated location based on the comparing.

15. The mobile device of claim 10, wherein the processor is configured to process the digital image information comprises by recognizing one or more symbols in the scene.

16. A mobile device, comprising:
means for receiving digital image information from a wireless headset configured to provide hands-free communication with the mobile device, the digital image information indicative of at least a scene in a forward direction;
means for receiving signal information from one or more motion sensors associated with the wireless headset, the signal information indicating motion of a user of the mobile device; and
means for processing the digital image information, for generating location information associated with one or more features in the scene based on the processing, for generating a position of the mobile device using the location information associated with one or more features in the scene based on the processing of the digital image information, and for updating the position of the mobile device using the signal information from the one or more motion sensors.

17. The mobile device of claim 16, further comprising:
means for generating audio navigation information based on the location information; and
means for transmitting the audio navigation information to the headset.

18. The mobile device of claim 16, further comprising:
means for generating visual navigation information based on the location information; and
means for displaying navigation images using the visual navigation information.

19. The mobile device of claim 16, wherein the means for receiving the digital image information comprises receiving filtered digital image information.

20. The mobile device of claim 16, wherein the means for processing the digital image information comprises means for comparing at least a portion of the digital image information with stored information, and wherein the means for generating the location information associated with one or more features in the scene comprises means for accessing an associated location based on the comparing.

21. The mobile device of claim 16, wherein the means for processing the digital image information comprises means for recognizing one or more symbols in the scene.

22. A non-transitory machine readable medium storing instructions that when executed by a processor cause one or more machines to perform operations comprising:

receiving digital image information from a wireless headset configured to provide hands-free communication with the mobile device, the digital image information indicative of at least a scene in a forward direction;

receiving signal information from one or more motion sensors associated with the wireless headset, the signal information indicating motion of a user of the mobile device;

processing the digital image information;

generating location information associated with one or more features in the scene based on the processing;

generating a position of the mobile device using the location information associated with one or more features in the scene based on the processing, and updating the position of the mobile device using the signal information from the one or more motion sensors.

23. The machine readable medium of claim 22, the operations further comprising:

generating audio navigation information based on the location information; and transmitting the audio navigation information to the headset.

24. The machine readable medium of claim 22, the operations further comprising:

generating visual navigation information based on the location information; and displaying navigation images using the visual navigation information.

25. The machine readable medium of claim 22, wherein the digital image information comprises receiving filtered digital image information.

26. The machine readable medium of claim 22, wherein processing the digital image information comprises comparing at least a portion of the digital image information with stored information, and wherein generating the location information associated with one or more features in the scene comprises accessing an associated location based on the comparing.

27. The machine readable medium of claim 22, wherein processing the digital image information comprises recognizing one or more symbols in the scene.

* * * * *